US00RE35674E

United States Patent [19]

Pustell

[11] E Patent Number: Re. 35,674

[45] Reissued Date of Patent: Dec. 2, 1997

[54] THERMOCOUPLE WITH OUT-OF-LINE ASPIRATION HOLES

[75] Inventor: Robert A. Pustell, Andover, Mass.

[73] Assignee: Amespace, Inc., Wilmington, Del.

[21] Appl. No.: 361,574

[22] Filed: Dec. 22, 1994

Related U.S. Patent Documents

Reissue of:

[64] Patent No.: 4,467,134
Issued: Aug. 21, 1984
Appl. No.: 510,095
Filed: Jun. 30, 1983

[51] Int. Cl.[6] ..... H01L 35/02

[52] U.S. Cl. ..... 136/231; 136/230; 374/144

[58] Field of Search ..... 136/230, 231, 136/232, 233; 374/144, 179, 208

[56] References Cited

U.S. PATENT DOCUMENTS

| | | | |
|---|---|---|---|
| 3,075,387 | 1/1963 | Rademacher | 73/359 |
| 3,159,032 | 12/1964 | Rademacher et al. | 73/359 |
| 3,284,246 | 11/1966 | Macatician | 136/231 |
| 3,451,862 | 6/1969 | Burgess, Jr. et al. | 136/231 |
| 3,459,598 | 8/1969 | Cole et al. | 136/231 |
| 4,131,756 | 12/1978 | Smith | 136/230 |
| 4,132,114 | 1/1979 | Shah et al. | 73/343 R |
| 4,162,929 | 7/1979 | Finney | 136/233 |
| 4,244,222 | 1/1981 | Hoyer et al. | 73/349 |
| 4,485,263 | 11/1984 | Itoyama et al. | 136/230 |

FOREIGN PATENT DOCUMENTS

| | | | |
|---|---|---|---|
| 1084989 | 9/1967 | United Kingdom | 136/230 |

OTHER PUBLICATIONS

Distribution of Local Pressure and Skin Friction Around a Circular Cylinder in Cross-Flow Up to Re=$5\times10^6$ by E. Achenbach, *Journal of Fluid Mechanics*, pp. 625–639, Apr. 1969.

*Primary Examiner*—Charles T. Jordan
*Assistant Examiner*—Chrisman D. Carroll
*Attorney, Agent, or Firm*—Ratner & Prestia

[57] ABSTRACT

The response time of a thermocouple is improved by offsetting the outlet aspiration opening or openings in the thermocouple protective housing from the gas flow axis and the inlet opening. The outlet aspiration opening is located substantially at the gas separation point which is a point of minimum gas pressure. The degree of offset is thus chosen to maximize the pressure differential, ΔP, between the inlet and the outlet openings. This increases the gas flow rate through the housing and past the thermocouple junction thereby substantially improving the thermocouple response time.

33 Claims, 1 Drawing Sheet

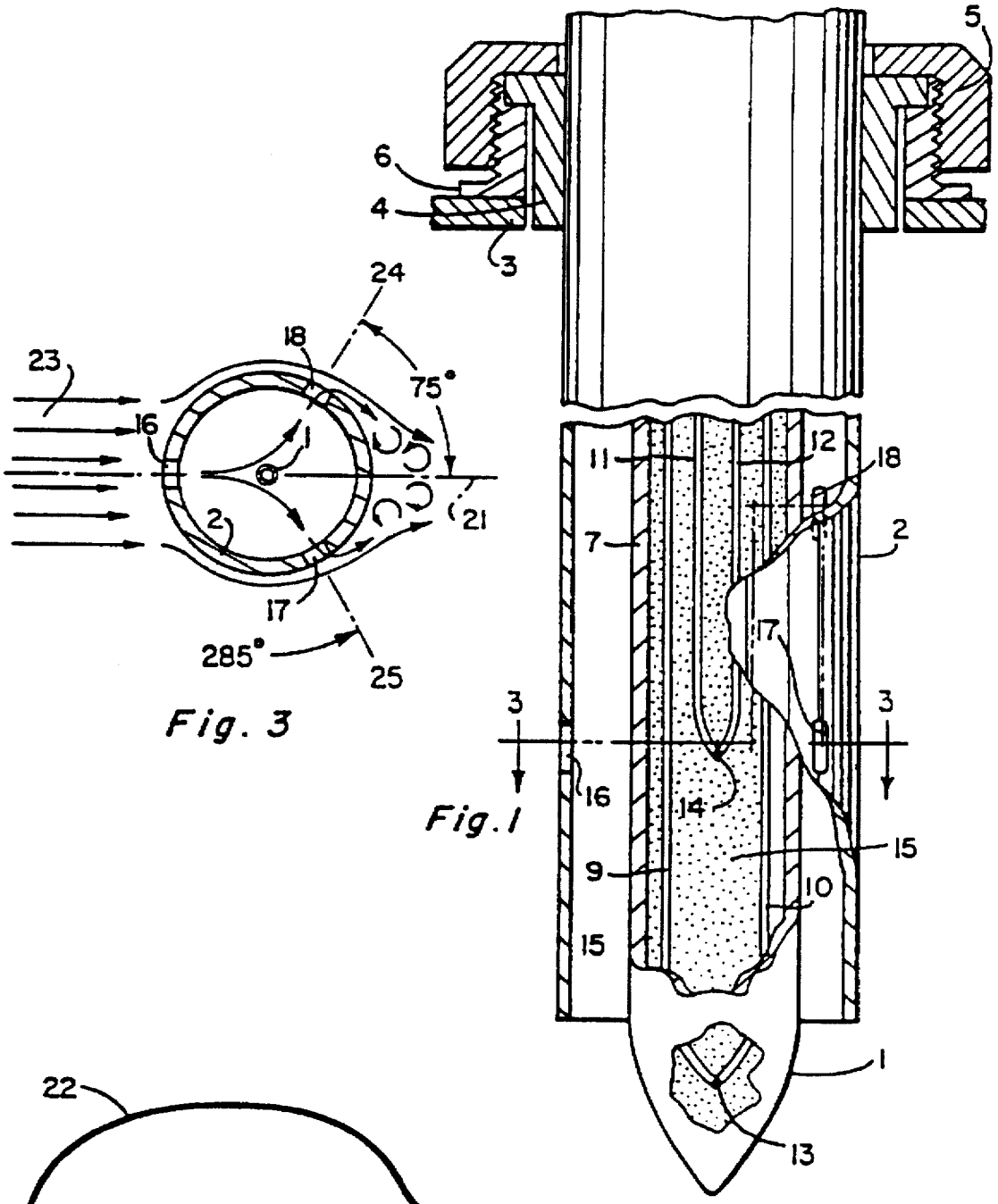
Fig. 3
Fig. 1
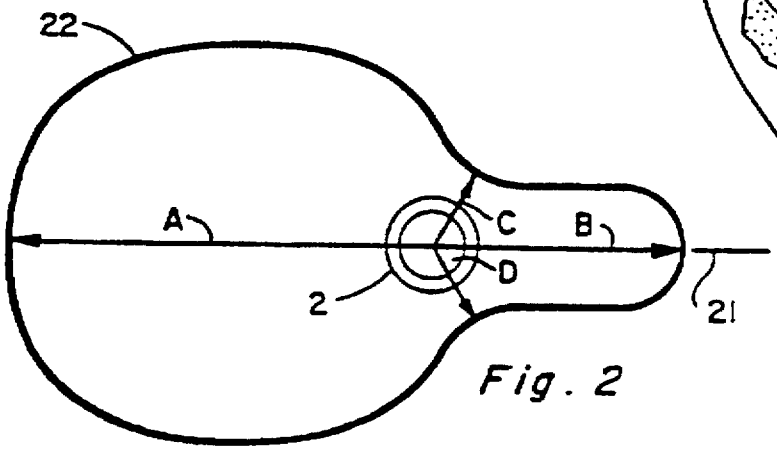
Fig. 2

THERMOCOUPLE WITH OUT-OF-LINE ASPIRATION HOLES

Matter enclosed in heavy brackets [ ] appears in the original patent but forms no part of this reissue specification; matter printed in italics indicates the additions made by reissue.

This invention rlates to thermocouples and, more particularly, to a thermocouple construction with improved response time.

A Thermocouple is a temperature sensing device containing a junction of two dissimilar metals which produces an electrical potential that is a measure of the temperature of the medium in which it is immersed. One important application of thermocouples is to measure the temperature of the exhaust gas stream of turbines and jet engines for safety and control purposes.

Because the thermocouple in such an application is exposed to an extremely hostile environment in terms of temperture and vibration, it is desirable to protect the thermocouple junction to the maximum extent possible. To this end, thermocouple structures have been developed wherein the wires are mounted in an insulating core which is positioned inside a metallic casing or sheath. A protective cylindrical housing is spaced from and surrounds the sheathed thermocouple to provide further protection. U.S. Pat. No. 3,007,990 which is assigned to General Electric Company, the assignee of the instant application, illustrates such a sheathed thermocouple. An alternative is to increase the size of a bare wire junction for greater life but in either case the problem of obtaining an adequately fast response time remains and the solution as presented herein is the same.

The protective housing or support around the thermocouple can, however, affect the speed with which the thermocouple responds to changes in gas stream temperature because of the static gas film which can form between the housing and the thermocouple sheath. In order to minimize response time while protecting the thermocouple to the maximum extent possible, such protective housings have been constructed to include inlet and outlet openings or aspiration holes located along the gas flow axis and in the vicinity of the buried thermocouple junction. This allows dynamic gas flow through the protective housing and results in turbulent gas flow so that the gas temperature in the vicinity of the junction tracks the temperature of the main stream. However, even with some measure of turbulent flow through the protective housing, the thermal mass of systems of this type is still sufficiently large so that the thermocouple does not respond to changes in temperature of the gas stream as rapidly as is desired with modern-day high-speed jet engines. Thus, it would be desirable to provide an arrangement in which the flow rate of the gas through the housing and past the thermocouple is maximized to optimize the response time of the thermocouple.

The instant invention is based on the discovery that the gas flow rate through the housing, and hence the response time of a protected thermocouple, may be optimized if the exit aspiration holes are positioned so that the outside static pressure is minimized. This is achieved by positioning the exit holes either at the minimum gas pressure points relative to the gas flow axis or in the minimal pressure areas on the downstream side of the housing. Applicant has found that the gas pressure differential will be at a maximum if the outlet aspiration holes are radially offset from the inlet hole and thus from the gas flow axis with the outlet holes located at or near the gas separation points for the housing. The gas separation point with respect to any structure positioned in a flowing gaseous stream is that point at which the gaseous boundary layer at the surface of the structure leaves or moves away from the surface. The surface pressure drops at the gas separation point of the structure and turbulent gas flow is produced downstream from the separation point.

With a cylindrical housing, the outlet holes are preferably positioned (using polar nomenclature) at angles of 75° and [345°] *285°* from the flow axis of the gas while the inlet is positioned along the flow axis (i.e., at 180°). While angles of 75° and [345°] *285°* are preferred, because they essentially represent the gas separation points and minimum gas pressure points around a cylindrical structure in a glowing gas stream, reduced pressure and improved thermocouple response time is realized if the aspiration holes are located in areas of minimal pressure, i.e., at angular positions from [60°] *45°*–85° and from [330°–385°] *275°–315°*. The ideal location is near the gas stream flow separation points from the probe support. Because of turbulence, varying angles of attack, surfact conditions of the support, etc., the best location or range of locations for any given application may vary from application to application and can be determined by suitable testing.

It is, therefore, a principal objective of this invention to provide a protected thermocouple structure with improved response time.

Another objective of the invention is to provide a thermocouple structure with a protective housing in which gas flow through the housing is maximized to optimize speed of response.

Still another objective of the invention is to provide an improved thermocouple and thermocouple housing structure in which pressure differential between the inlet and outlet openings on the protective housing is maximized to improve response time of the thermocouple mounted in the housing.

Other objectives and advantages of the invention will become apparent as the description thereof proceeds.

The various objectives and the advantages of the invention are realized in one form thereof by positioning a sheathed thermocouple in a protective cylindrical housing which has its inlet and outlet aspiration holes so positioned that a maximum pressure differential exists between inlet and outlet. One or more outlet aspiration holes are positioned at points of minimum pressure (preferably at the gas separation points) for a cylindrical tube. The outlet aspiration hole is thus displaced from the inlet hole and the flow axis of the gaseous stream preferably by angles of 75 and/or [345°] *285°*. The pressure differential between the inlet and outlet aspiration holes is substantially larger than it would be if the aspiration hole were located along the flow axis as is the inlet hole. Increase in pressure differential increases the gas flow rate through the housing and gas turbulence in the vicinity of the sheathed thermocouple and there substantially improves the response time of the protected thermocouple.

The novel features which are believed to be characteristic of this invention are set forth with particularity in the appended claims. The invention itself, however, both as to its organization and method of operation, together with further objectives and advantages thereof, may best be understood by reference to the following description taken in connection with the accompanying drawings in which:

FIG. 1 is a partially broken away view of a thermocouple.

FIG. 2 is a polar diagragm showing the pressure distribution around a cylindrical member positioned in a flowing gas stream.

FIG. 3 is a sectional view of the thermocouple taken along lines 3—3 of FIG. 1.

As is illustrated in FIG. 1, the thermocouple assembly, including the sheathed thermocouple 1 and protective housing 2 surrounding the sheathed thermocouple, is installed by mounting it through an opening in a housing wall 3 of a gas turbine or jet engine so that it extends into a fluid stream, the temperature of which is to be measured. The assembly is externally attached to a metallic mounting flange 4. A nut 5 having an internal annular flange bears against flange 4 and is threaded over an externally threaded member 6 which is attached by welding or otherwise to chamber wall 3. The foregoing is only one of many mounting schemes that can be used for the thermocouple.

The sheathed thermocouple assembly 1 contains a generally tubular sheath or case 7 with a closed end which is made of stainless steel or other suitable metal. The thermocouple assembly contains a plurality of thermocouple junctions, one of which is located in a portion of the thermocouple located within protective housing 2 and the other of which is located in the tip portion which extends beyond the housing and is exposed directly to the heated fluid stream. Extending through the bore of sheath 7 are two pairs of dissimilar conductors 9 and 10, and 11 and 12 respectively. Conductors 9 and 10 are joined at their ends to form thermocouple junction 13, and leads 11 and 12 are joined to form thermocouple junction 14.

Conductors 9–10 and 11–12 are, as pointed out previously, of dissimilar metals and may preferably be Chromel-Alumel combinations such as the one sold by the Hoskins Corporation of Detroit, Mich. under the ANSI Type K designation. The Chromel wire is typically 90% nickel with chromium and other trace elements whereas the Alumel is a 98% nickel with aluminum or silicon and other trace elements as the remaining 2% of the metal. The thermocouple conductors are insulated from each other and from the sheath by a suitable insulating core consisting of a powdered insulating material 15 which may comprise magnesium oxide, $M_gO$, other metal oxides such as aluminum oxide, $Al_2O_3$, or these oxides mixed with glass powder.

As may be seen in FIG. 1, one thermocouple junction is positioned in the tip of the assembly outside of protective housing 2, whereas the other one is a buried junction located within housing 2. Junction 13 which is positioned in the tip of the thermocouple normally has a much more rapid response to temperature changes because the thermocouple casing surrounding it is exposed directly to the heated gas stream. Thermocouple junction 14, on the other hand, being positioned in the housing, is surrounded by a relatively static gas film so that changes in stream temperature are not reflected very rapidly in the vicinity of junction 14.

In order to produce dynamic gas flow past the junction positioned within protective housing 2, the housing contains a plurality of aspiration openings which allows part of the gaseous stream to flow through the housing in the vicinity of the thermocouple junction. Gas enters through inlet aspiration opening 16 located on the upstream side of the housing and leaves through a plurality of outlet aspiration openings 17 and 18 located downstream of the inlet opening.

In the arrangement shown in FIG. 1, and as one aspect of the invention, outlet opening 17 and inlet opening 16 are located in the same plane as thermocouple junction 14 whereas outlet opening 18 is axially displaced and is positioned above the plane of thermocouple junction 14. Axial displacement of one or more of the exit aspiration openings can be advantageous in improving the heat transfer between the gas flowing through the housing and the junction. That is, by having outlet openings above or below the plane of the thermocouple junction, or both, turbulence is increased and the gas above and below the junction is rapidly heated to the temperature of the stream resulting in better heat transfer to the buried thermocouple junction. While the instant invention is not limited to the specific axial location, that is, whether in above or below the plane of the thermocouple junction, it may be useful to have the exit openings axially displaced to improve the heat transfer characteristics by insuring that the gas temperature both above and below the thermocouple junction is representative of the dynamic gas flow rather than of any static gas trapped within the housing.

The importance of the location of the exit aspiration hole or holes; i.e., the importance of the displacement of the aspiration hole axis from the flow axis of the gas and radial displacement from the inlet may be most readily understood in connection with FIG. 2 which shows a polar plot of the pressure distribution around a cylindrical housing which has its axis normal to the direction of the gas flow. For a cylindrical protective housing positioned with its axis normal to the flow of gas, the flow axis of the gas stream is shown at 21. Line 22 illustrates the pressure distribution of the flowing gas around the protective cylindrical housing.

The maximum pressure, as might be expected, is directly in front of the cylindrical housing; i.e., the upstream side of the housing and is illustrated by the Vector A, which in a polar plot, has an Amplitude A at an angle of 180°. The maximum dynamic pressure at the rear face of the housing is illustrated by the Vector B, which in a polar plot, has a magnitude B and is located at 0°. Pressure at the rear of downstream side of the housing, represented by Vector B is smaller than the upstream pressure, but not by a great deal. As a result, the pressure differential in an arrangement in which the inlet and outlet aspiration openings are on the same axis (i.e., in line) is relatively small. The minimum pressure points (essentially at the gas separation points) around the cylinder (or related distributions for other cross-sectional shapes) are shown by Vectors C and D which are located approximately 75° and [345°] *285°* with respect to the axis of Vector B.

By locating the exit aspiration holes at these angles, i.e., the minimum pressure points, the pressure differential $\Delta P$ which is a ratio of A/C and A/D is large and is substantially larger than the pressure differential that exists if the exit aspiration hole is located along flow axis 21. As a result of this radial displacement of the exit aspiration hole from the flow axis, and from the tube diameter on which the inlet aspiration hole is located, the flow rate of the gas through the housing and past the buried thermocouple junction is substantially more rapid than it would be if the exit aspiration hole is located along the flow axis. Consequently, a thermocouple system having such displaced exit aspiration holes; displaced along an axis so that the gas pressure at the exit aspiration hole is substantially at a minimum, results in improved response time for the thermocouple positioned in the protective housing.

Although angular displacements of 75° and [345°] *285°* are optimum, the invention is not limited thereto. There is a range of angular displacements where the dynamic pressure is substantially lower than it is on the back or downstream side of the housing. Thus, the exit aspiration holes on a cylindrical support may be located in these areas of minimal pressures, areas which are in the range of [60°] *45°*–85° and [330°–385°] *275°–315°* and at similar related locations for other geometric shapes. The ideal locations for all cases being established by the gas flow separation points for that shape.

FIG. 3 illustrates the respective locations of the inlet and outlet aspiration holes with respect to the flow axes of the gas and represents a section taken along the lines 3—3 of FIG. 1. Protective housing 2 is positioned with its axis normal to flow axis 21 of the gaseous stream shown generally by means of the arrows 23. Inlet aspiration hole 16 is located along the flow axis of the gaseous streams while the outlet aspiration holes 16 and 17 are angularly displaced from the flow axis. As may be seen the aspiration hole axes 24 and 25 are respectively located at approximately 75° and [345°] *285°* measured from the downstream side of the flow axis. The thermocouple is co-axial with the axis of the protective housing and, as may be seen, the heated gases entering through aspiration hole 15 flow past the thermocouple and exit through the aspiration holes 16 and 17 and rejoin the main gaseous stream. By maximizing the pressure differential between the inlet and outlet aspiration holes, the velocity of the gas flow through the housing and past the thermocouple and, hence, the degree of turbulence inside the housing in the vicinity of the thermocouple, is increased eliminating or minimizing static gas boundary layers in the vicinity of the thermocouple junction. The protected junction is, therefore, at all times exposed to the variations in temperature of the moving gas stream. As a result the response of the protected thermocouple is very rapid while at the same time protecting the thermocouple from the severe environmental conditions (temperature and vibration) to the maximum extent possible.

In order to illustrate the effectiveness of the invention in improving the response time of a thermocouple assembly, the following examples are provided:

A thermocouple assembly was constructed having a stainless steel housing with a 0.10" inlet opening and two (2) 0.08" outlet openings. The outlet openings were located at an angle of 75° and 285° with respect to the flow axis and the inlet opening and were axially displaced with respect to the plane of the inlet opening. The outlet openings were respectively positioned 0.100" above and below the inlet opening. The assembly was heated to 1000° F. in a furnace; removed from the furnace and placed in a room temperature (70° F.) gaseous stream. The flow rate of the stream, in lbs/ft$^2$-sec., was 20 lbs/ft$^2$-sec. The procedure was repeated for flow rates of 30 and 35 lbs/ft$^2$-sec. The time ($\tau$) required, at each flow rate, for the thermocouple to reach 63.1% of the value was then measured to indicate the response time of the thermocouple and the data converted for a stream temperature of 802° C. which is typical of the gas temperature in a jet engine.

A thermocouple assembly was then constructed in which the outlet openings were located at angles of 40° and 320° respectively. The same procedure was followed for determining the response time.

The data obtained is shown in Table I below:

TABLE I

| Flow Rate lbs/ft$^2$-sec | Outlet Opening Location (Degree of Offset) | Response Time (Sec) ($\tau$ = 63.1% of Temperature Change) |
|---|---|---|
| 20 | 75° (285°) | 4.4 sec. |
| 30 | " | 3.45 sec. |
| 35 | " | 3.1 sec. |
| 20 | 40° (320°) | 6.2 sec. |
| 30 | " | 5.2 sec. |
| 35 | " | 4.8 sec. |

It is clearly apparent from this data that at each flow rate the response time of the thermocouple is improved. The improvement in response time ranges from 1.6 to 1.8 secs, or 29% at a flow rate of 20 lbs/ft$^2$-sec.; 33.6% at 30 lbs/ft$^2$-sec. and 35.4% at 35 lbs/ft$^2$-sec.

The subject invention has been described as having its principal utilization in detecting changes in the temperature in the exhaust stream of a jet engine, it is apparent, however, that thermocouples constructed in accordance with the invention can be utilized to measure and control the temperature of other streams or materials.

While the instant invention has been shown with certain preferred embodiments thereof, the invention is by no means limited thereto since other modifications of the instrumentalities employed may be made and still fall within the scope of the invention. It is contemplated by the appended claims to cover any such modifications that fall within the true scope and spirit of this invention.

What is claimed as new and desired to be secured by Letters Patent of the United States is:

1. A thermocouple assembly for measuring the temperature of a fluid stream comprising:
   (a) a casing,
   (b) at least one pair of dissimilar wires disposed in said casing and forming a thermocouple junction,
   (c) insulation dispersed in said casing and separating said dissimilar wires from said casing and from each other,
   (d) a protective housing spaced apart from and surrounding at least a portion of said casing containing a thermocouple junction,
   (e) means to allow a part of the heated stream to flow through said protective housing and past said casing in the area of the thermocouple junction, including:
      (1) an inlet opening in said housing positioned essentially along the flow axis of the stream, *said inlet opening in axial alignment with said thermocouple junction, and*
      (2) at least one outlet opening in said housing downstream from the inlet opening to establish a flow path through said housing, *and*
   (f) means for increasing the flow rate of the fluid through said housing by locating the outlet opening at a minimum fluid pressure point, thereby maximizing the pressure difference between inlet and outlet openings to provide rapid response of the thermocouple to changes in fluid stream temperature.

2. The thermocouple assembly according to claim 1 wherein said outlet opening is radially offset from the axis of said inlet opening.

3. The thermocouple according to claim 2 wherein an outlet opening in the housing is located either 75° or 285° from the downstream side of the fluid stream flow axis.

4. The thermocouple according to claim 2 wherein an outlet opening in the housing is located within a band extending either from 45°–85° or 275°–315° from the downstream side of the fluid stream flow axis.

5. The thermocouple according to claim 2 wherein offset outlet openings are located on both sides of said axis.

6. The thermocouple according to claim 5 wherein the offset outlet openings are respectively located 75° and 285° from the downstream side of the fluid stream flow axis.

7. The thermocouple according to claim 5 wherein the offset openings are respectively located within bands extending from 45°–85° and from 275°–315° from the downstream side of the fluid stream flow axis.

8. The thermocouple according to claim 5 wherein the outlet openings are axially offset from the plane of the inlet opening.

9. The thermocouple according to claim 8 wherein the outlet openings are respectively located above and below the plane of the inlet openings.

10. The thermocouple according to claim 6 wherein the outlet openings are axially offset from the plane of the inlet opening.

11. The thermocouple according to claim 6 wherein the outlet openings are respectively located above and below the plane of the inlet opening.

12. The thermocouple according to claim 7 wherein the outlet openings are axially offset from the plane of the inlet opening.

13. The thermocouple according to claim 7 wherein the outlet openings are respectively located above and below the plane of the inlet opening.

14. A thermocouple assembly for measuring the temperature of a gaseous stream including at least one thermocouple junction positioned in a casing surrounded by a protective housing spaced from said casing, (a) means to expose the thermocouple junction in said housing to a gaseous stream including an inlet opening and at least one outlet opening in said housing, *the inlet opening and thermocouple junction being axially aligned,*

(b) said outlet opening being *radially* offset from the inlet opening, the degree of off-set being chosen to locate the outlet opening in a minimal pressure area on the outside of the housing to maximize the pressure difference across said openings and the gas flow rate through said housing.

15. A thermocouple assembly for measuring the temperature of a gaseous stream including at least one protected thermocouple junction surrounded by a housing spaced from said thermocouple, the space between said protected thermocouple and said housing being accessible to the gaseous stream, (a) an inlet and at least one outlet opening in said housing to produce gas flow through the space between said thermocouple and [the] *said* housing, *the inlet opening and thermocouple junction being axially aligned,*

(b) means to maximize the gas flow rate [throught] *through* said space comprising locating the outlet opening in said housing substantially at the gas separation point for the gaseous boundary layer on the exterior of the housing whereby the gas pressure at the outlet opening is minimized and the pressure differential between inlet and outlet openings is maximized.

*16. A thermocouple assembly for measuring the temperature of a fluid stream comprising:*

*(a) a casing;*

*(b) a first pair of dissimilar wires disposed in said casing and forming a first thermocouple junction;*

*(c) a second pair of dissimilar wires disposed in said casing and forming a second thermocouple junction axially spaced from said first thermocouple junction;*

*(d) insulation dispersed in said casing and separating said dissimilar wires from said casing and from each other;*

*(e) a protective housing spaced apart from and surrounding at least a portion of said casing containing a first thermocouple junction;*

*(f) means to allow a part of the heated stream to flow through said protective housing and past said casing in the area of the thermocouple junctions, including:*

*(1) an inlet opening in said housing positioned essentially along the flow axis of the stream, and*

*(2) at least one outlet opening in said housing downstream from the inlet opening to establish a flow path through said housing; and*

*(g) means for increasing the flow rate of the fluid through said housing by locating the outlet opening at a minimum fluid pressure point, thereby maximizing the pressure difference between inlet and outlet openings to provide rapid response of the thermocouple to changes in fluid stream temperature.*

*17. The thermocouple assembly according to claim 16 wherein said housing has one open end, and one of said thermocouple junctions extends beyond said open end of said housing.*

*18. The thermocouple assembly according to claim 16 further including a second outlet opening, wherein the outlet openings are respectively located above and below the plane of the inlet opening.*

*19. The thermocouple assembly according to claim 17 wherein said outlet opening is radially offset from said inlet opening.*

*20. The thermocouple assembly according to claim 19 wherein an outlet opening in the housing is located within a range of from 45° to 85° on either side of the downstream side of the fluid stream flow axis.*

*21. The thermocouple assembly of claim 20 including two outlet openings, one located 45° to 85° on one side and one located 45° to 85° on the other side of the downstream side of the fluid flow stream axis.*

*22. The thermocouple assembly of claim 21 wherein the outlet openings are respectively located above and below the plane of the inlet opening.*

*23. The thermocouple assembly according to claim 17 further including a second outlet opening, wherein the outlet openings are respectively located above and below the plane of the inlet opening.*

*24. The thermocouple assembly according to claim 19 wherein offset outlet openings are located on both sides of the fluid stream flow axis.*

*25. The thermocouple assembly according to claim 24 wherein the offset outlet openings are respectively located within bands extending from 45°–85° and from 275°–315° from the downstream side of the fluid stream flow axis.*

*26. The thermocouple assembly according to claim 24 wherein the outlet openings are respectively located above and below the plane of the inlet opening.*

*27. The thermocouple assembly of claim 1 further including a second pair of dissimilar wires disposed in said casing and forming a second thermocouple junction axially spaced from said first thermocouple junction, wherein*

*said protective housing has one open end, and one of said thermocouple junctions extends beyond said open end of said housing.*

*28. The thermocouple assembly according to claim 27 wherein an outlet opening in the housing is located within a range of from 45° to 85° on either side of the downstream side of the fluid stream flow axis.*

*29. The thermocouple assembly of claim 28 including two outlet openings, one located 45° to 85° on one side and one located 45° to 85° on the other side of the downstream side of the fluid flow stream axis.*

*30. The thermocouple assembly of claim 29 wherein the outlet openings are respectively located above and below the plane of the inlet opening.*

*31. The thermocouple assembly according to claim 1 wherein an outlet opening in the housing is located within a range of from 45° to 85° on either side of the downstream side of the fluid stream flow axis.*

*32. The thermocouple assembly of claim 31 including two outlet openings, one located 45° to 85° on one side and one located 45° to 85° on the other side of the downstream side of the fluid flow stream axis.*

*33. The thermocouple assembly of claim 32 wherein the outlet openings are respectively located above and below the plane of the inlet opening.*

* * * * *

UNITED STATES PATENT AND TRADE MARK OFFICE

CERTIFICATE OF CORRECTION

PATENT NO. : Re. 35,674
DATED : December 2, 1997
INVENTOR(S) : Pustell

It is certified that error appears in the above-identified patent and that said Letters Patent is hereby corrected as shown below:

At column 1, line 9, delete "rlates" and insert --relates--.

At column 1, line 21, delete "temperture" and insert --temperature--.

At column 2, line 20, delete "surfact" and insert --surface--.

At column 7, line 52, after "*containing*", delete the term "*a*" and substitute therefor the term --*said*--.

Signed and Sealed this

Twenty-first Day of April, 1998

Bruce Lehman

*Attest:*

BRUCE LEHMAN

*Attesting Officer*

*Commissioner of Patents and Trademarks*